(12) United States Patent
Eick et al.

(10) Patent No.: US 11,994,636 B2
(45) Date of Patent: *May 28, 2024

(54) WAVSEIS SOURCING

(71) Applicant: CONOCOPHILLIPS COMPANY, Houston, TX (US)

(72) Inventors: Peter M. Eick, San Antonio, TX (US); Joel D. Brewer, Sealy, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/447,479

(22) Filed: Jun. 20, 2019

(65) Prior Publication Data

US 2021/0109240 A1 Apr. 15, 2021

Related U.S. Application Data

(63) Continuation of application No. 15/215,229, filed on Jul. 20, 2016, now Pat. No. 10,379,236.

(60) Provisional application No. 62/195,407, filed on Jul. 22, 2015.

(51) Int. Cl.
  *G01V 1/00* (2024.01)
  *G01V 1/143* (2006.01)
  *G01V 1/37* (2006.01)

(52) U.S. Cl.
  CPC .............. *G01V 1/005* (2013.01); *G01V 1/143* (2013.01); *G01V 1/37* (2013.01); *G01V 2210/1214* (2013.01); *G01V 2210/1295* (2013.01)

(58) Field of Classification Search
  CPC ........... G01V 1/005; G01V 2210/1214; G01V 1/143; G01V 1/37; G01V 2210/1295

USPC .......................................................... 367/36
See application file for complete search history.

(56) References Cited

U.S. PATENT DOCUMENTS

| | | |
|---|---|---|
| 4,926,392 A | 5/1990 | Handley et al. |
| 6,643,470 B1 | 11/2003 | Iida et al. |
| 7,295,490 B1 | 11/2007 | Eick et al. |
| 7,864,630 B2 | 1/2011 | Chiu et al. |
| 8,004,931 B2 | 8/2011 | Eick et al. |
| 8,467,267 B2 | 6/2013 | Eick et al. |
| 8,651,228 B2 | 2/2014 | Eick et al. |
| 8,893,848 B2 | 11/2014 | Eick et al. |
| 10,379,236 B2 * | 8/2019 | Eick ............ G01V 1/005 |
| 2003/0093224 A1 | 5/2003 | Jeffryes |
| 2009/0183624 A1 | 7/2009 | Kira |
| 2010/0103772 A1 | 4/2010 | Eick et al. |
| 2010/0103773 A1 | 4/2010 | Chiu et al. |

(Continued)

FOREIGN PATENT DOCUMENTS

| WO | 20130166062 A1 | 11/2013 |
|---|---|---|
| WO | 2014207148 A1 | 12/2014 |

OTHER PUBLICATIONS

Bagaini, Land Seismic Techniques for High Quality Data, Oilfield Review 22(2): 28-39 (2010).

(Continued)

*Primary Examiner* — Daniel L Murphy
(74) *Attorney, Agent, or Firm* — CONOCOPHILLIPS COMPANY

(57) ABSTRACT

Improved methods of providing acoustic source signals for seismic surveying, wherein a plurality of signals can be easily separated from one another after data acquisition, wherein the source signals are not sweep based.

20 Claims, 6 Drawing Sheets

(56) References Cited

U.S. PATENT DOCUMENTS

| | | |
|---|---|---|
| 2010/0195434 A1 | 8/2010 | Menger et al. |
| 2010/0208554 A1 | 8/2010 | Chiu et al. |
| 2011/0128818 A1 | 6/2011 | Eick et al. |
| 2012/0033529 A1 | 2/2012 | Eick et al. |
| 2012/0039150 A1 | 2/2012 | Eick et al. |
| 2012/0147701 A1 | 6/2012 | Ross et al. |
| 2012/0275266 A1 | 11/2012 | Eick et al. |
| 2013/0170317 A1 | 7/2013 | Stork |
| 2013/0284535 A1 | 10/2013 | Eick et al. |
| 2013/0286771 A1 | 10/2013 | Eick et al. |
| 2013/0286780 A1 | 10/2013 | Eick et al. |
| 2013/0286788 A1 | 10/2013 | Eick et al. |
| 2013/0286790 A1 | 10/2013 | Eick et al. |
| 2013/0288897 A1 | 10/2013 | Babcock et al. |

OTHER PUBLICATIONS

Bagaini, Overview of Efficient Vibroseis Acquisition Methods, EAGE 68th Conference & Exhibition—Vienna, Austria, Jun. 12-15, 2006.

Chiu, Stephen K., Eick, Peter, P., and Emmons, Charles W., "High Fidelity Vibratory Seismic (HFVS): Optimal Phase Encoding Selection", SEG/Houston 2005 Annual Meeting, p. 37-39.

Huo S. & Wang Y. Improving adaptive subtraction in seismic multiple attenuation. GEOPHYSICS, 74(4), V59-V67 (2009).

Mahdad, A., et al. Separation of blended data by iterative estimation and subtraction of blending interference noise. GEOPHYSICS, 76(3), Q9-Q17 (2011).

International Search Report and Written Opinion for related application, App. No. PCT/US2016/043158, issued Sep. 28, 2016.

\* cited by examiner

WAVSEIS SOURCING

PRIOR RELATED APPLICATIONS

This application is a continuation application which claims benefit under 35 USC § 120 to U.S. application Ser. No. 15/215,229, filed Jul. 20, 2016, which claims benefit under 35 USC § 119(e) to U.S. Provisional Application Ser. No. 62/195,407 filed Jul. 22, 2015, entitled "WAVSEIS SOURCING," which are incorporated herein in their entirety.

FIELD OF THE DISCLOSURE

The disclosure relates to seismic prospecting for hydrocarbon resources and especially to the acquisition of seismic data using WAVSEIS sourcing methods, instead of the traditional sweep.

BACKGROUND OF THE DISCLOSURE

Seismic surveys image or map the subsurface of the earth by imparting acoustic energy into the ground and recording the reflected energy or "echoes" that return from the rock layers below. Each time the energy source is activated it generates a seismic signal that travels into the earth, is partially reflected, and, upon its return, may be recorded at many locations on the surface as a function of travel time.

A land seismic survey typically uses one of two energy sources to generate the down going seismic signal: either an explosive source or a vibrational source. Of particular interest for purposes of the instant disclosure is the use of seismic vibrators. A seismic vibrator generally takes the form of a truck or other vehicle that has a base plate that can be brought into contact with the earth. A reaction mass in association with a baseplate is driven by a hydraulic system to produce vibratory motion that travels downward into the earth via the base plate. This truck-mounted vibrator sends a seismic sweep into the earth and then the collected data is correlated and stored. This type of seismic vibrator is also known by the name "vibroseis" or the vibroseis method.

The receivers that are used to detect the returning seismic energy for the land survey usually take the form of sensors like geophones or accelerometers. The returning seismic energy is acquired from a continuous signal representing displacement, velocity or acceleration that may be represented as an amplitude variation as a function of time.

A seismic survey may be designed that uses multiple vibrators, each being activated simultaneously so that the receivers and recording instruments capture a composite signal with contributions from all of the vibrators. The composite signal forms a separable source vibrator record that allows for source separation through data inversion. Similarly, the same system with multiple vibrators may be activated independently, with or without encoding of the signal, followed by subsequently using the receivers and a recording instrument to capture a composite signal with contributions from multiple vibrators.

This composite signal can be separated into individual source records through data inversion or other more modern separation techniques like Adaptive-Subtraction. As an example, the ZenSeis® method uses the inversion technique and is covered under patents U.S. Pat. Nos. 7,295,490, 7,864,630, 8,004,931, 8,467,267 and 8,893,848, each of which is incorporated by reference herein in its entirety for all purposes.

Vibrators work on the principle of introducing a user-specified band of frequencies, known as the sweep, into the Earth and then cross-correlating that sweep function with the recorded data to define reflection events. This is normally called the "vibroseis" technique or method. The parameters of a vibrator sweep are:
  i. Start frequency
  ii. Stop frequency
  iii. Sweep rate
  iv. Sweep length
  v. Gain or boost rate A vibrator can do an upsweep that starts with a frequency as low as 1 to 2 Hz and stops at a high value of 80, 100, or 120 Hz. Alternatively, vibrators can do a downsweep that starts with a high frequency and finishes with a low frequency. Most Vibroseis data are generated with upsweeps to avoid ghosting problems in the subsequent correlation step.

The sweep rate can be linear or nonlinear. A linear rate causes the vibrator to dwell for the same length of time at each frequency component. Nonlinear sweeps are used to emphasize higher frequencies because the vibrator dwells longer at higher frequencies than it does at lower frequencies.

Sweep length defines the amount of time required for the vibrator to traverse the frequency range between the start and stop frequencies. As sweep length is increased, more energy is put into the Earth because the vibrator dwells longer at each frequency component. Sweep length is usually in the range of 2 to 40 seconds or longer.

If a vibrator sweep is 12 seconds long, then each reflection event also spans 12 seconds in the raw, uncorrelated data in the vibroseis method. It is not possible to interpret uncorrelated vibroseis data because all reflection events overlay each other and individual reflections cannot be recognized.

Gain or boost rate is the amount of extra time spent sweeping at different frequencies as a function of time. A linear sweep changes frequencies as a uniform function of time so each frequency band has the same amount of time spent on it. A positive boost or gain sweep spends more time in the later parts of the survey, which in an upsweep are the high frequencies. Alternatively, a negative boost or gain sweep spends less time in the later parts of the survey, which in an upsweep are the high frequencies. The opposite holds true in a downsweep so more time is spent in the low frequencies or less depending on the sign of the gain. Gain or boosts are normally expressed in terms of dB and usually range from 3 to 12 dB.

The data are reduced to an interpretable form by a cross-correlation of the presumed known input pilot sweep with the raw data recorded at the receiver stations. Each time the correlation process finds a replication of the input pilot sweep, it produces a compact symmetrical correlation wavelet centered on the long reflection event. In this correlated form, vibroseis data exhibit a high signal-to-noise ratio, and reflection events are robust wavelets spanning only a few tens of milliseconds.

As a general observation, if an area is plagued by random noise, vibrators are an excellent energy source because the correlation process used to reduce the vibrator sweep to an interpretable form discriminates against noise frequencies that are outside the source sweep range. Plus, if several sweeps are summed, any disorganized noise in the sweep range is attenuated by the power of summation or stacking of the data. However, if coherent noise with frequencies within the vibrator sweep frequency range is present, then the correlation process may accentuate these noise modes.

The duration of a vibroseis survey is largely determined by the long signal sweeps of the vibroseis source (typically 10-30 s). These long sweeps are required to obtain the necessary signal-to-noise ratio, but they also make vibroseis surveys time-consuming. To reduce survey time, methods have been developed to deploy various vibroseis groups simultaneously, based on transmitting specially encoded source sweeps. Codes have been designed such that the interfering source responses can be separated in a preprocessing step. Some of the more common simultaneous vibroseis recording methods are known as slip-sweep (Shell), ZenSeis® phase encoding (ConocoPhillips), Independent Simultaneous Sources or "ISS" (British Petroleum), flip-flop, orthogonal sweeps, cascading, upsweep-downsweep, etc., and combinations thereof. Additionally to these methods, new separation methods are being developed that depend on acquisition design parameters optimized for the separation of simultaneous or near simultaneous vibroseis sources.

However, all of these methods are still wedded to the idea of a sweep, which is really a function of the original equipment not allowing the generation of more complex signals. Vibroseis trucks use hydraulic motors to shake a baseplate, with the force opposed by a heavy weight mounted on the vehicle, and the ability to generate more complex signals with this hydraulic vibrator is very limited.

However, we have developed an electric seismic source with greatly increased capacities to vary the signal. U.S. Pat. No. 8,893,848 describes an electrically driven source wherein an acoustic energy delivery system comprises a frame carrying a number of linear motors. Each linear motor includes a tubular body and a rod or actuation bar positioned within the tubular body that extends telescopically from the lower end of the tubular body.

In operation, the frame is lowered into proximity to the ground G and the linear motors are operated to lower the replaceable feet into contact with the ground G. Once all of the replaceable feet are in contact with the ground G, the linear motors are activated to thrust the rods toward the ground G and deflect the ground G, thereby delivering an impulse into the earth. Since the linear motors are individually controllable, the ability is now available to develop seismic surveying methodologies that are no longer bound to the sweep principle.

Thus, there exists a need for developing methods for generating unique vibratory source acoustic signals that can be easily differentiated from one another, with high signal to noise ratios and without interference from harmonics, coherent noise, and the like. This application addresses one or more of these improvements.

SUMMARY OF THE INVENTION

We have recently invented an electric seismic source, described in U.S. Pat. No. 8,893,848 and shown in FIG. 1-3. With the advent of a new type of electrically driven vibrator, we are no longer tied to the simple sweep, slip sweep, phase encoded sweeps and the like to generate the original acoustic signal. Instead, we can use this invention as a high fidelity seismic source and leave sweep-based technology behind.

The method can be generally described as follows:

The first requirement of designing the source effort for a seismic survey is to establish how long the seismic source unit needs to be operated to establish a useable signal. This length of time would normally be called the "pad time." This step is the same in the current method.

The next requirement is to figure out what sort of sweep to put in the ground via the source to get the desired data back. The usual method of doing this is to figure the lowest frequency the source can shake and the highest frequency normally returned from the field and then do some form of linear or non-linear upsweep to cover those frequencies. However, with the new methodology described herein, a sweep is no longer required, and instead we have the ability to modulate one or more of phase, rhythm, frequency, amplitude, and tonality (timbre) of the input signal—in essence generating a "song" rather than a simple sweep or a small variation thereon.

We call this new technique "WavSeis" to differentiate it from other methods of generating a source signal such as ZenSeis® (phase encoding) and the like. In the WavSeis method, one need not use a conventional sweep based acoustic signal, but can instead move freely over the scales, varying the frequency of the "notes," their amplitude, rhythm, tonality, and even overlaying notes or frequencies to produce harmonics. This variability is essentially a "song" that the vibrator will play instead of the sweep into the ground. The song should, however, cover all of the bands desired with the amount of energy to meet the imaging objective.

It should be understood by those skilled in the art that the invention described in this patent can be applied not only to a plurality of seismic sources, but to any individual seismic source independently. A plurality of sources is not a requirement.

Finally, one considers if one or many sweeps are desired, and should they be encoded. Encoding and multiple WavSeis songs may be required if you have to separate out the signals from others if you are running the same sweeps within some range of synchronous fashion. If, however, you modulate the frequency (notes), phase, rhythm, amplitude and tonality of the input signal, you can make a distinct single song that would allow separation in the inversion or other process with a single song, even if others are played simultaneously.

As a simple example of this, a 30 second section of Beethoven's $5^{th}$ symphony is easily separable from a 30 second section of Van Halen's "Eruption". By ear one can easily separate classic music from modern Rock and Roll and in the computer by inversion or even correlation if the musical segment is properly chosen.

The key to implementing this method is to ensure that the input songs are sufficiently different that if they overlapped there would be minimal source contamination. This can be determined by cross correlating the two signals and changing one of them to maximize the separability. To do this one takes a body of e.g., music files, and then breaks them into the appropriate sweep length segments (for example 30 second segments). Then, the user cross-correlates the selected input song segments with every other segment. Finally, one sorts out the best combinations of segments from the rest of the segment combinations to give the maximum separability during the Adaptive Subtractive or inversion process.

As an example, a family of chosen musical "MP3" files could be put into a directory and once the desired song length is chosen, say a 45 second single song, a computer could systematically compare every possible 45 second segment of every mp3 file together and find the best possible match that minimizes the cross-correlation and maintains the desired bandwidth. The pitch should be dropped from normal human hearing range of 20 Hz to 20,000 Hz down to e.g., 1-200 Hz so it can be used in the seismic bandwidth so the music will not sound "normal" to a human ear, but the variability of the signal will be maintained.

An analogy to this is standing in a crowded room and listening to a conversation among all of the different conversations going on. If the speaker has a distinct enough voice it is easy to hear him or her over the other voices. This is because one's ear is tuned to a particular voice's unique signature, so it can easily be sorted out from the background noise.

The length of the single song would be the time needed to establish useable signal in the ground and the songs would be cross correlated for maximum separability at the start of the survey. A simple analogy would be Vivaldi's "Four Seasons". Each song therein is very different and if each source was only playing one of them, it would be easy to separate them out using the continuous data records and an inversion or adaptive-subtractive programs. Inversion is preferred over correlation due to the lack of correlation side lobes, but adaptive-subtractive techniques are becoming more commonplace.

Another example is using input of a segment of Led Zeppelin's "Stairway to Heaven" and Tchaikovsky's "1812 Overture". Even a casual observer could observe that the two songs are totally different and an appropriate 20-60 sec segment of each could be chosen to allow accurate separation and still cover the desired bandwidth.

There is no particular requirement that each source sweep be the same segment length. What is required is that the appropriate bandwidth is covered with enough energy to be properly processed. Thus, the source playing the "1812 Overture" may need 45 seconds to meet the bandwidth requirements while the source playing "Stairway to Heaven" may need 32 seconds. Given modern separation techniques like adaptive-subtractive filtering or inversions, this is not expected to present a concern.

One advantage of the WavSeis "song" style chirp is that the sources could operate completely independently and the signals would have little or no overlap, so a seismic survey crew could improve their efficiency. Another advantage is that there is a large repository of available potential songs available in most users i-tunes folders. If desired, a synthetic song can be made that truly maximizes the advantages of the technique by creating the appropriate bandwidth and minimizes the cross correlation by computer algorithms. This lacks the simplicity of searching available MP3 files for appropriate segments, but it can be done if needed.

Another point is that sub-segments of available sweeps can be concatenated together to build out the bandwidth and optimize the cross-correlations. Thus, there is nothing to stop one from grabbing a few seconds of the 1812 overture and adding it to the end of a few seconds of Iron Butterfly's "In a Godda Da Vida" then adding a few seconds of Katy Perry's "Roar". Musically this might be painful to listen to, but as a means of maximizing the WavSeis technique it would work well.

A further point that developed during our experimentation was that the conventional hydraulic vibe is somewhat capable of handling these input WavSeis songs, but it has some issues with fidelity of the recreation of the song. This is due to the fact that a hydraulic based vibrator is mechanically similar to a subwoofer on a home stereo and so it is limited in its ability to play a highly variable signal. However, the dynamic non-conventional WavSeis nature of the input songs is actually pretty easy on the hydraulics and reduces the instantaneous demands on the hydraulic systems. It does this by not drawing down the accumulators with a long period of time spent in the low frequencies at once. Music tends to have a beat and is more variable than a conventional sweep, which tends to draw down the accumulator pressures and stress the hydraulics during operation. Thus, there tends to be less distortion with WavSeis song chirps than with conventional linear sweeps, especially in the low end of the sweeps.

This summary is provided to introduce a selection of concepts that are further described below in the detailed description. This summary is not intended to identify key or essential features of the claimed subject matter, nor is it intended to be used as an aid in limiting the scope of the claimed subject matter.

As used herein, "sweep" means a sequential increase or decrease in frequency over a period of time and over several frequencies. In other words, in an upsweep, the frequency gets sequentially higher from the lowest frequency to the highest. In a down sweep, the frequency steps sequentially lower from the highest frequency to the lowest. The sweep is also sometimes called a 'chirp." Sweeps often are linear (see e.g., FIG. 4), e.g., the frequency changes or steps being the same over time. However, non-linear sweeps are also possible (see e.g., FIG. 5). Changes in sweep direction are also possible.

Sweeps need not always have the same amplitude. Windowing techniques, such as the Blackman-Harris window are applied to shape the chirp (see e.g., FIG. 6). The Kaiser window and plateau width parameters can also be adjusted to produce a variety of chirp shapes (e.g., FIG. 7).

However, these are all still basically sweep-based acoustic or seismic signals, wedded to the basic idea that an acoustic signal must travel sequentially up or down the frequency scale in order to expose the reservoir to the needed frequencies.

However, sweep based signals are no longer required with the advent of high fidelity electric vibrators that can produce much more complex wave patterns. In "WavSeis" source signals, two or more of the frequency, rhythm, amplitude, phase and tonality all change, but in a generally non-sequential way over the total length of the WavSeis song, although there may be a few notes (6, 5, 4, 3, or less) that change sequentially within the overall WavSeis song.

Exemplary songs are illustrated in FIG. 8-10.

Once the seismic recordings are collected, they are processed by computer, as is known in the art. This method can be applied to new software or to any existing software platform for doing e.g., 2D, 3D, 4D and even 5D seismic processing and imaging provided the appropriate coding or module is applied thereto and otherwise consistent with the programming parameters. Exemplary software includes, e.g., Petrel E&P, PetroSys, Omega, GeoPro, SeisWare Seismic Software, Paradigm Echos® seismic processing and imaging solutions, GeoCraft, and the like.

Further, the seismic processing and imaging software can be combined with other reservoir and geological modeling systems, such as geophysical model building, rock physics evaluation, and reservoir modeling, e.g., IBM® System Blue Gene/P® Solution, the Jason™ software suite, JewelSuite, and the like.

A large list of free geophysics software is published at http://en.wikipedia.org/wiki/List_of_free_geophysics_software and is incorporated by reference herein in its entirety.

Hardware may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system.

Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors. Slower systems could be used but are less preferred since seismic processing and imaging is already compute intensive.

The present disclosure also relates to an apparatus for performing the operations herein. This apparatus may be specially constructed for the required purposes of modeling, or it may comprise a general-purpose computer selectively activated or reconfigured by a 3-D modeling computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

In one embodiment, the computer system or apparatus may include graphical user interface (GUI) components such as a graphics display and a keyboard which can include a pointing device (e.g., a mouse, trackball, or the like, not shown) to enable interactive operation. The GUI components may be used both to display data and processed data products and to allow the user to select among options for implementing aspects of the method. The computer system may store the results of the methods described above on disk storage, for later use and further analysis. Additionally, the computer system may include one or more processor for running said modeling program and algorithms.

"Simultaneous" sweeps (or songs) are conducted by two or more seismic sources during overlapping periods of time.

As used herein "cross-correlation" is the computation of a spatial cross-covariance model between two regionalized variables. This provides a measure of spatial correlation between the two variables. Cross-correlation and comparison is a really powerful and simple technique. Normally one builds a table of cross correlation coefficients like an inversion matrix to optimize the separation.

As used herein "inversion" is the process of systematically taking the input data from the receivers and sources then statistically separating and summing the individual shot record trace data out of the combined record by various methods. Refer to U.S. Pat. No. 7,295,490 (incorporated by reference herein in its entirety for all purposes) as an example of this process.

As used herein, an "iterative adaptive subtraction" method refers to a method that repeatedly applies a filter in order to subtractively suppress one type of coherent energy signal over another type of coherent energy. An example is the use of the technique where the coherent energy of multiples is subtractively suppressed without affecting primaries. See e.g., Huo & Wang (2009) and Mandad (2011).

By not "substantially overlapping" we mean the chirps are different enough as to be seismically distinguishable in processing of the signals.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

DETAILED DESCRIPTION

The disclosure provides a new method for generating sweep-independent source signals for use in seismic surveying. The new methodology is called "WavSeis," and preferably uses electric vibrators, which can produce high fidelity, complex signals more like a song than a simple frequency sweep or the very limited variations thereon that are currently available.

Electric Vibrator

Figure 1:
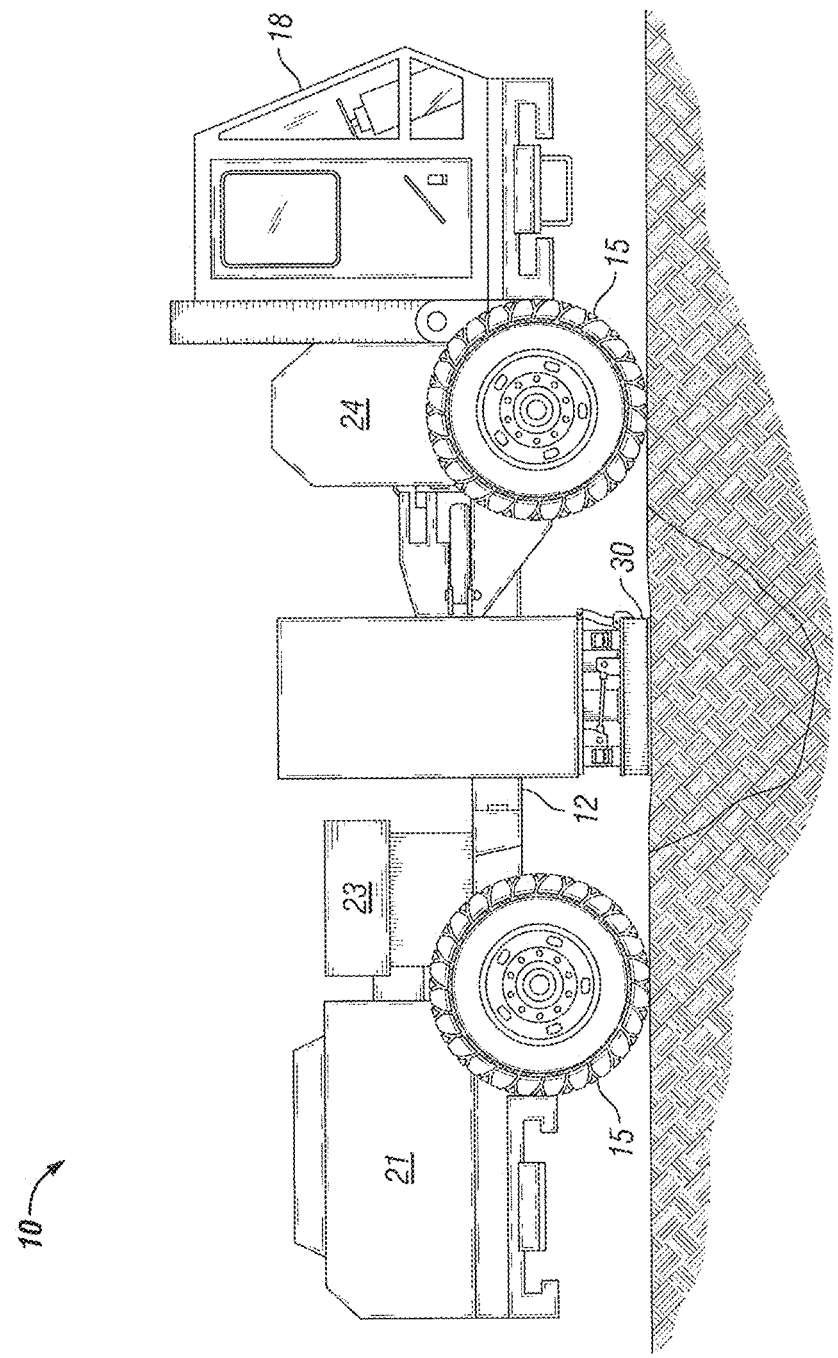
FIG. 1 is an elevation view of an electric seismic source vehicle.

Although the method can use any high fidelity signal generator, one suitable generator has been invented by the inventors herein, and it may be a preferred source. FIG. 1 illustrates an electric vibrator actuator vehicle 10 comprising a chassis 12, four wheels 15 and a driver's cab 18. The source 10 uses a diesel engine 21 to turn an electric generator 23 making electrical power for delivering acoustic energy into the ground. A large battery, capacitor bank or both 24 may be included to store energy for high load situations of high electrical demand or when there are problems with the generator 23, but the battery 24 could also provide the power to return to base for repair.

Figure 2:
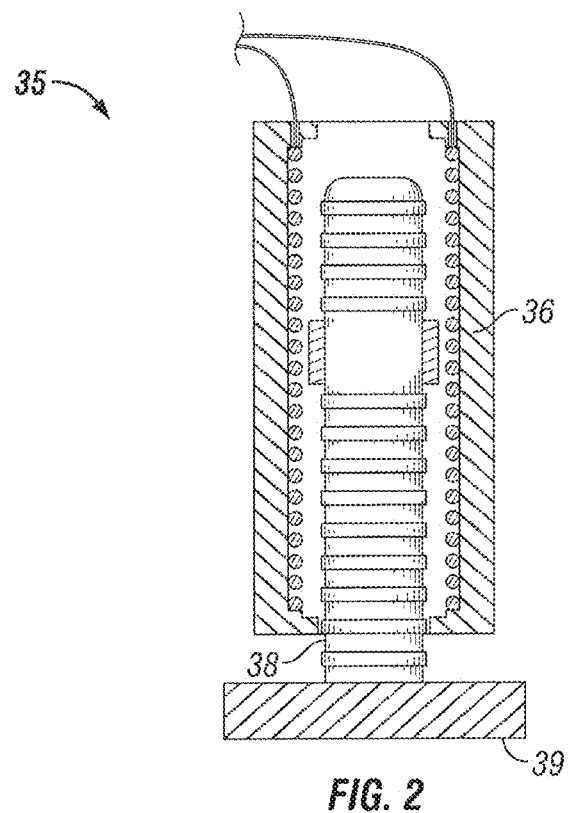
FIG. 2 is an enlarged fragmentary view of an electromechanical linear motor assembly for delivering seismic energy into the ground.
Figure 3:
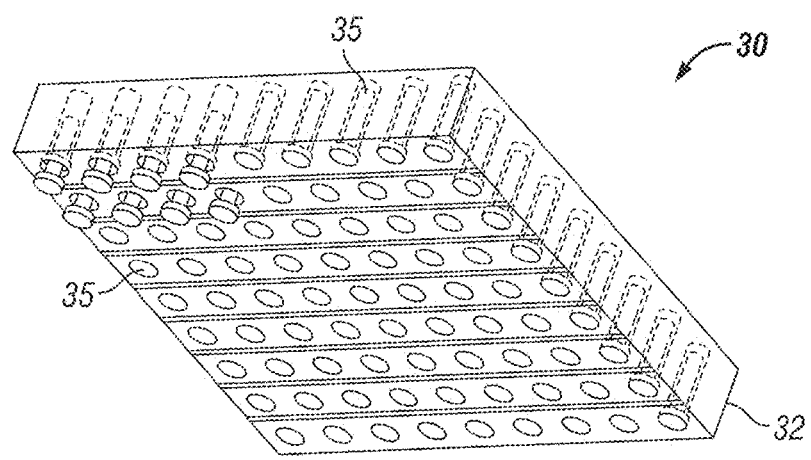
FIG. 3 is an enlarged perspective fragmentary view of a grid of electro mechanical linear motor assemblies for cooperatively delivering seismic energy into the ground.
Figure 4:
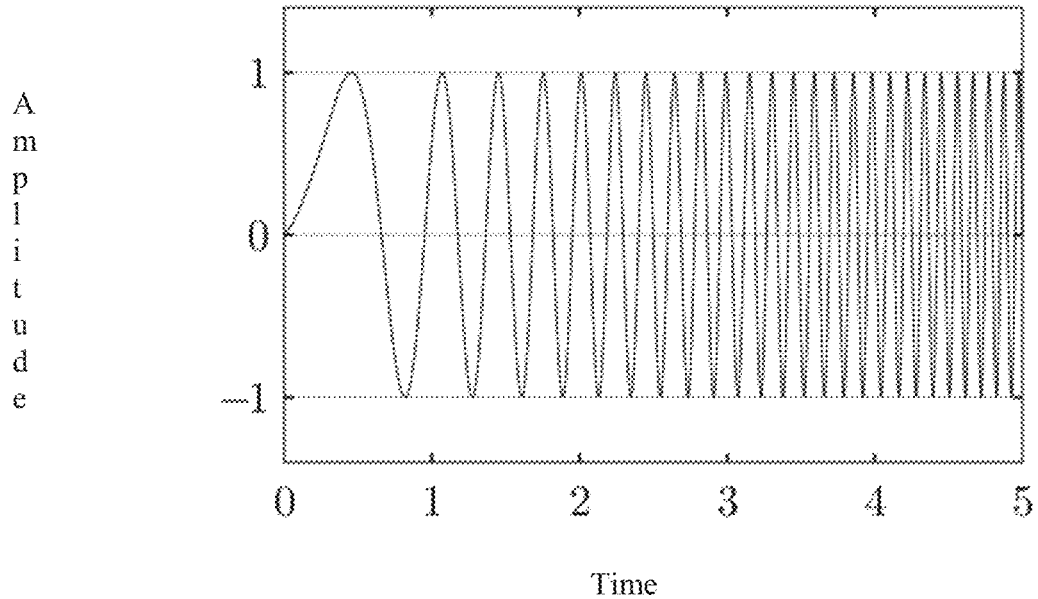
FIG. 4 shows a single, linear sweep signal with unvarying amplitude.
Figure 5:
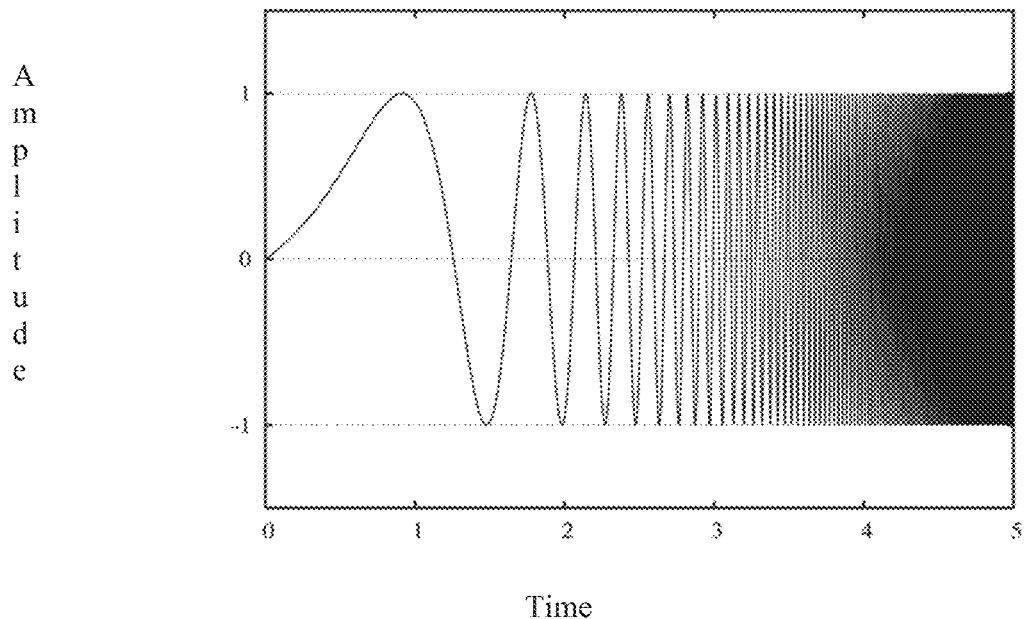
FIG. 5 shows a non-linear sweep signal. In this case the sweep has an exponential increase over time.
Figure 6:
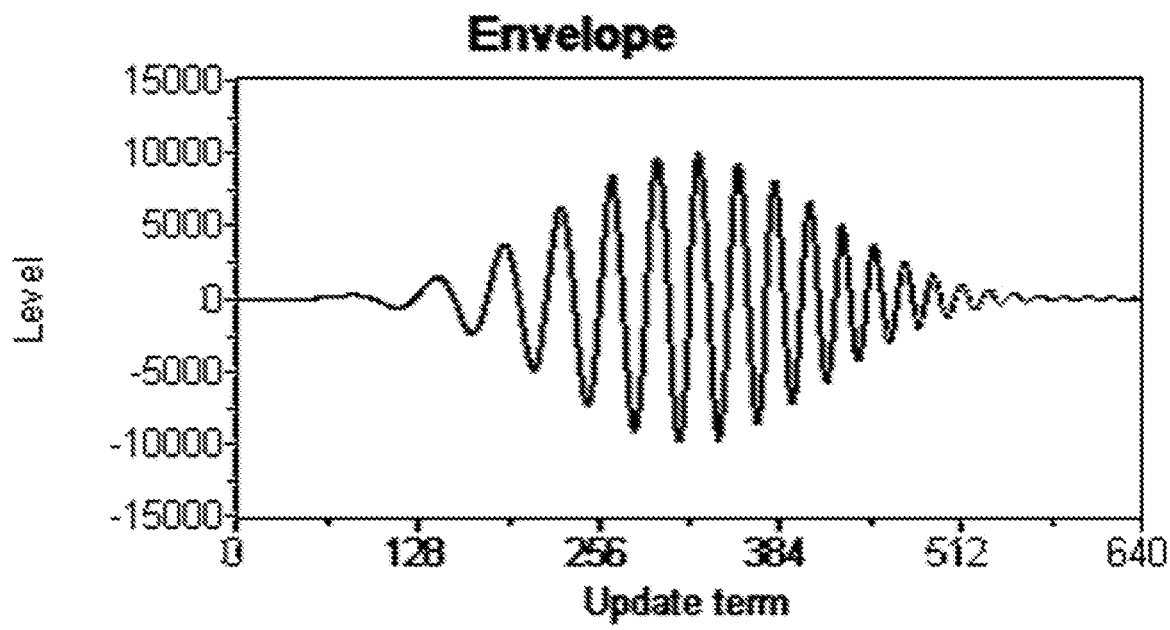
FIG. 6 demonstrates an envelope constrained chirp, wherein the chirp is constrained by the Blackman-Harris window.
Figure 7:
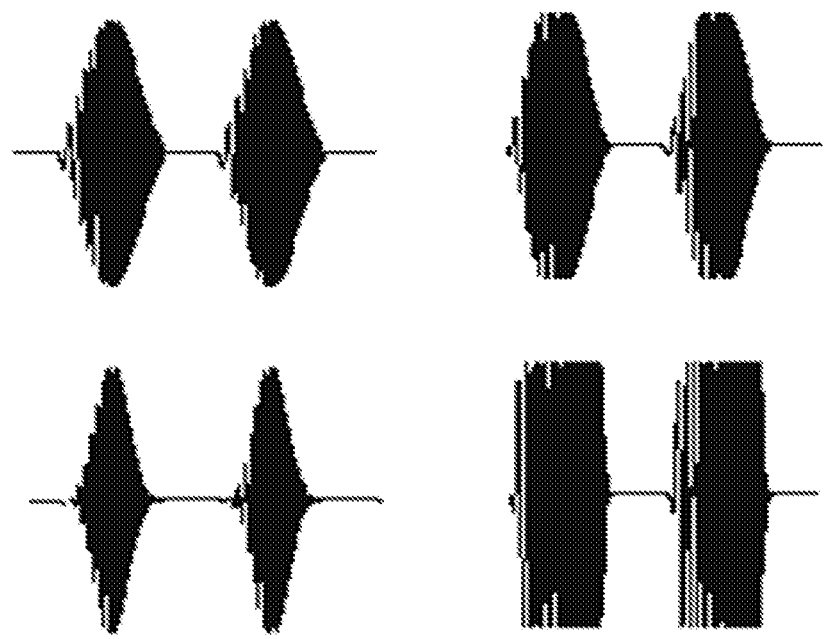
FIG. 7. The Kaiser window and plateau width parameters can be adjusted to produce a variety of chirp envelope shapes.

In FIGS. 2 and 3, the acoustic energy delivery system 30 is carried under the chassis 12 and comprises a frame 32 including mounts for a number of linear motors 35. Each linear motor 35 includes a tubular body 36 and a rod 38 within the tubular body 36 that can extend telescopically from the lower end of the tubular body 36. A replaceable foot 39 is attached to the bottom end of the rod 38 for contacting the ground.

In operation, the frame 32 is lowered to the ground and the linear motors 35 are actuated to lower the replaceable feet 39 into contact with the ground G. Once all of the replaceable feet 39 are in contact with the ground G, the linear motors 35 are activated in some desired order to thrust the rods 38 toward the ground G and thereby deliver an impulse into the earth. The linear motors 35 are quickly operated to recoil the rods 38 without disengaging contact with the ground G by the replaceable feet 39. By successive thrusts and recoils, acoustic energy is effectively delivered into the earth while the feet remain in contact with the ground G.

Electric linear motors 35 do not suffer the limitations of the hydraulic pumping systems. Cycling electric power to the linear motors 35 allows controlled movement of the rods 38 within the tubular bodies 36 and with such instant response, that the impulse frequency range is greatly expanded. By using electrical control circuits that are commonly available for diesel electric train locomotives and hybrid cars, the power can be applied instantly with a very high degree of control and stabilization. Linear motors are highly controllable due to the ability to control the force and velocity of the rods 38 via changes in the voltage and amperage of the applied current. Also the back-EMF generated can be accurately used as a feedback circuit to compensate for variations in the wear patterns and ground impedance variations so that the combined chirp of the whole group of linear motors is consistent and repeatable.

WavSeis Songs

Figure 8:
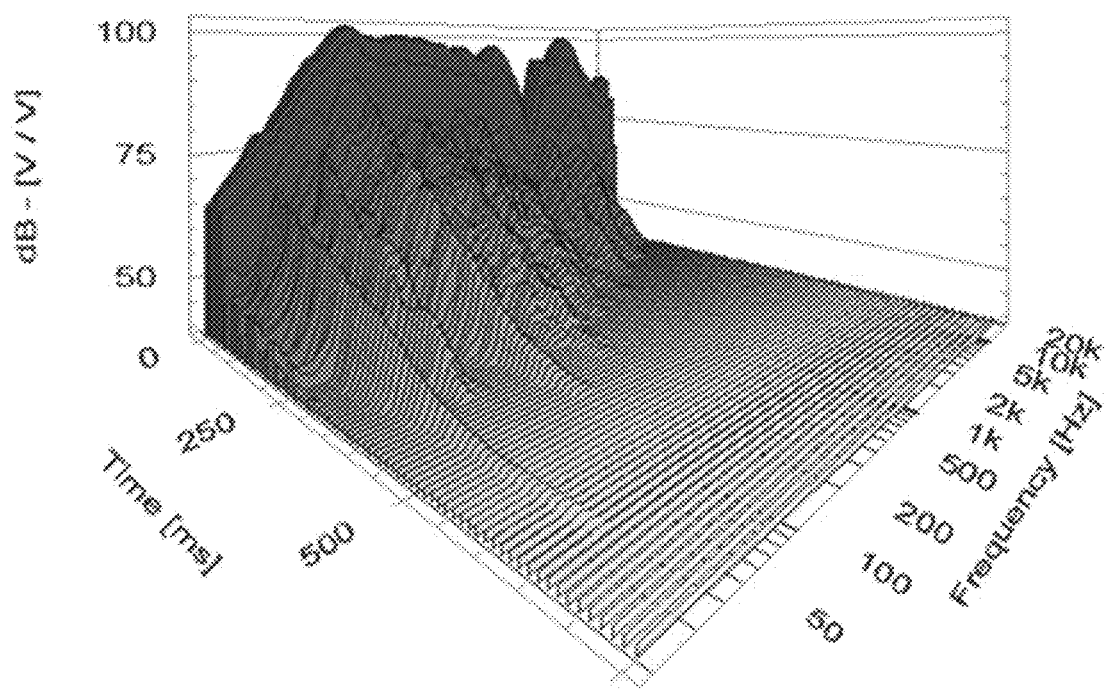
FIG. 8 provides Exemplary song, plotted in 3 dimensions herein (frequency, time and amplitude).
Figure 9:
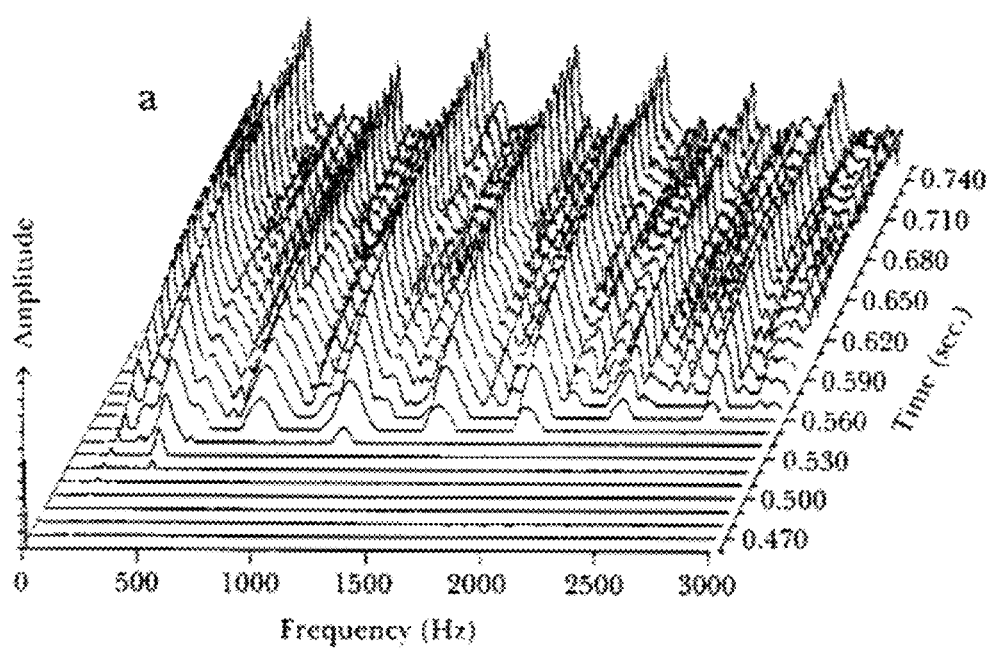
FIG. 9 provides an additional Exemplary song.
Figure 10:
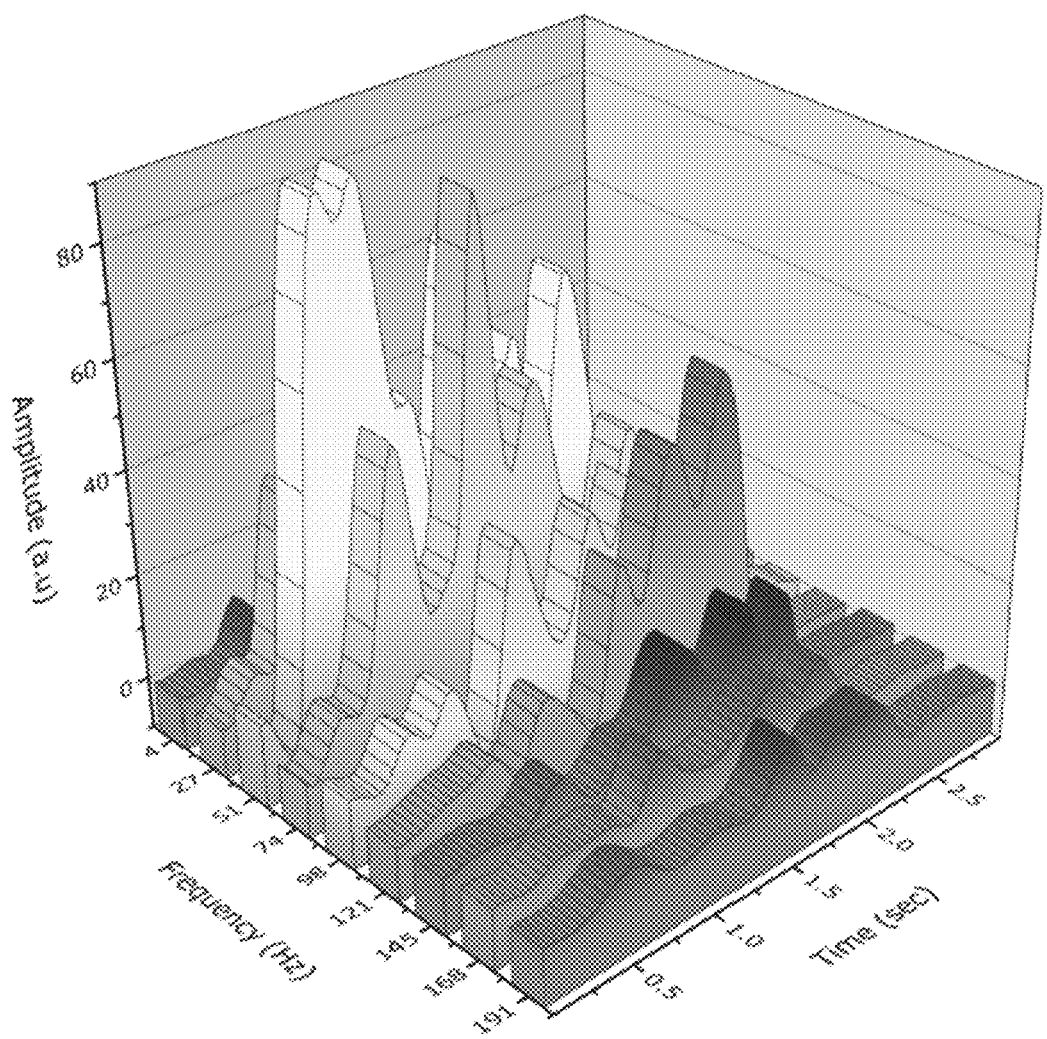
FIG. 10. provides yet another Exemplary song.

Exemplary songs are plotted in a 3D manner in FIGS. 8, 9 and 10.

The present methods includes any of the following embodiments in any combination(s) of one or more thereof:

A plurality of seismic source signals for seismic surveying, said each seismic source signal having a length t, a plurality of frequencies and a plurality of amplitudes at a plurality of times, wherein said plurality of frequencies and plurality of amplitudes do not vary sequentially by more than 6, 5, 4, or 3 notes or frequencies, and wherein said plurality of seismic source signals are each unique and do not substantially overlap in frequency and amplitude and rhythm such that they can be distinguished from each other.

A plurality of n seismic source signals for seismic surveying, said each seismic source signal having a length t (t1, t2 . . . tn), and having a pattern p (p1, p2 . . . pn), comprising a plurality of frequencies and a plurality of amplitudes at a plurality of times, wherein said plurality of frequencies and plurality of amplitudes do not vary sequentially throughout said length, and wherein said plurality of seismic source signal patterns (p1, p2 . . . pn) do not substantially overlap in frequency, rhythm or amplitude such that they can be distinguished from each other.

A plurality of seismic source songs for seismic surveying, said each seismic source song having a length and a series of notes having non-sequentially varying frequencies and a rhythm, wherein said plurality of frequencies does not vary sequentially (e.g. increasing or decreasing sequentially) over more than 6, 5, 4 or 3 notes, and wherein said plurality of seismic source songs are each unique and preferably do not overlap at all, or do not overlap for more than 1, 2, 3 or 4 notes in frequency or rhythm such that plurality of seismic source signal songs can be distinguished from each other.

A plurality of seismic source signals as herein described, wherein said plurality of patterns were confirmed by cross correlation to not substantially overlap.

A plurality of seismic source signals as herein described, which do not overlap in timbre, phase, harmonics, rhythm, pitch, etc, or at least do not overlap for more than 2 or 3 or 4 sequential notes.

A method of acquiring seismic survey data, comprising:
  a) providing one or more electric or hydraulic vibratory sources;
  b) each vibratory source providing a different acoustic signal pattern p (p1, p2 . . . pn), having a length t (t1, t2 . . . tn);
  c) each pattern (p1, p2 . . . pn) comprising a plurality of frequencies and a plurality of amplitudes, wherein said plurality of frequencies and plurality of amplitudes do not vary sequentially over said entire length;
  d) confirming that said plurality of seismic source signal patterns (p1, p2 . . . pn) do not substantially overlap such that they can be separated from each other, and if not changing one or more seismic source signal patterns or a portion thereof and repeating step d;
  e) applying said patterns to a reservoir, and
  f) acquiring reflected and refracted seismic signal data at one or more receivers; and,
  g) processing said signal data to create a seismic survey.

A method as herein described, wherein confirming step d) uses cross-correlating two patterns and changing one of them to maximize the separability, and repeating for each pair of patterns.

A method as herein described, wherein said processing includes separating reflected and refracted seismic signal data from each of said patterns. Preferably, the separating step uses inversion or the separating step uses an iterative adaptive subtraction method.

A method of surveying a reservoir, comprising:
  a) providing one or more electric vibratory sources near a reservoir;
  b) each vibratory source providing a different acoustic signal pattern p (p1, p2 . . . pn), having a length t (t1, t2 . . . tn);
  c) each pattern (p1, p2 . . . pn) comprising a plurality of frequencies and a plurality of amplitudes having a rhythm, wherein said plurality of frequencies and plurality of amplitudes do not increase or decrease sequentially for more than 3 notes over length t;
  d) confirming by cross-correlation that said plurality of patterns (p1, p2 . . . pn) do not substantially overlap such that they can be separated from each other, and if not, altering one or both of said patterns to maximize a separability of said patterns;
  e) applying said patterns to said reservoir;
  f) acquiring reflected and refracted signal data at one or more receivers;
  g) separating said signal data from each of said patterns to produce separated data;
  h) processing said separated data to produce processed data;

i) preparing a graphical representation of said reservoir based on said processed data.

A method as herein described, wherein said patterns are applied to said reservoir simultaneously, or are applied to said reservoir sequentially.

The following references are incorporated by reference in their entirety.

Bagaini, Land Seismic Techniques for High Quality Data, Oilfield Review 22 (2): 28-39 (2010).

Bagaini, Overview of Efficient Vibroseis Acquisition Methods, EAGE 68th Conference & Exhibition—Vienna, Austria, 12-15 Jun. 2006.

CHIU, Stephen K., EICK, Peter, P., and EMMONS, Charles W., "High Fidelity Vibratory Seismic (HFVS): Optimal Phase Encoding Selection", SEG/Houston 2005 Annual Meeting, p. 37-39.

Huo S. & Wang Y. Improving adaptive subtraction in seismic multiple attenuation. GEOPHYSICS, 74 (4), V59-V67 (2009).

Mandad, A., et al. Separation of blended data by iterative estimation and subtraction of blending interference noise. GEOPHYSICS, 76 (3), Q9-Q17 (2011).

US20100103773 Simultaneous Multiple Source Extended Inversion

US20100195434 Heterodyned Seismic Source

US20100208554 Multiple seismic signal inversion

US20110128818 Extraction of discrete records from continuous seismic recordings

US20120033529 Optimal source signature determination

US20120039150 Unique seismic source encoding

US20120275266 Simultaneous conventional and phase-encoded seismic acquisition

US20130286771, US2013286788, U.S. Pat. Nos. 8,651,228, 8,893,848 Discrete electric seismic source US20130286780 US2013286790 US2013288897 Distinctive land seismic sweep U.S. Pat. No. 7,295,490 System and method of phase encoding for high fidelity vibratory seismic data U.S. Pat. No. 7,864,630 Method and apparatus for minimizing interference between seismic systems U.S. Pat. No. 7,864,630 Method and apparatus for minimizing interference between seismic systems U.S. Pat. No. 8,004,931 Dynamic source parameter selection for seismic vibrator data acquisition U.S. Pat. No. 8,467,267 Asynchronous operation of seismic sources in a seismic survey

The invention claimed is:

1. A system for conducting two or more seismic surveys simultaneously said system comprising:

two or more high fidelity seismic sources;

a computer comprising a computer readable storage medium with a plurality of seismic source signals for seismic surveying, each seismic source signal comprising a different seismic source signal pattern p ($p_1$, $p_2$ ... $p_n$), said seismic source signal pattern having a length t ($t_1$, $t_2$ ... $t_n$), a plurality of frequencies and a plurality of amplitudes at a plurality of times, and wherein said plurality of seismic source signals are each unique and do not substantially overlap in frequency and amplitude and rhythm such that they can be distinguished from each other, cross correlating two or more of said seismic source signals, changing one or more of the seismic sources signals to provide maximum separability during an adaptive subtractive or inversion process, said seismic source signals providing sufficient energy to achieve an imaging objective; and a plurality of seismic receivers, said seismic receivers continuously recording during a seismic survey.

2. The plurality of seismic source signals of claim 1, which do not substantially overlap in timbre.

3. The plurality of seismic source signals of claim 1, which do not substantially overlap in phase.

4. A computer comprising a computer readable storage medium with a plurality of n seismic source signals for seismic surveying, providing a number of n seismic source signals for seismic surveying, each seismic source signal having a length t ($t_1$, $t_2$ ... $t_n$), and having a pattern p ($p_1$, $p_2$ ... $p_n$), comprising a plurality of frequencies and a plurality of amplitudes at a plurality of times, wherein said plurality of frequencies and plurality of amplitudes do not vary sequentially over an entirety of said length, wherein said plurality of seismic source signals patterns ($p_1$, $p_2$ ... $p_n$) do not substantially overlap in frequency, rhythm or amplitude such that they can be distinguished from each other, and cross correlating two or more of said seismic source signals, changing one or more of the seismic sources signals to provide seismic source signals with maximum separability during an adaptive subtractive or inversion process, said seismic source signals providing sufficient energy to achieve an imaging objective.

5. The plurality of n seismic source signals of claim 4, which do not overlap in timbre.

6. The plurality of n seismic source signals of claim 4, which do not overlap in phase.

7. A method of acquiring seismic survey data using one or more seismic source signals of claim 1, comprising:

a) providing one or more electric or hydraulic vibratory sources;

b) each vibratory source providing a different acoustic signal pattern p (p1, p2 ... pn), having a length t ($t_1$, $t_2$ ... $t_n$);

c) each pattern ($p_1$, $p_2$ ... $p_n$) comprising a plurality of frequencies and a plurality of amplitudes, wherein said plurality of frequencies and plurality of amplitudes do not vary sequentially;

d) cross correlating two or more of said seismic source signals, changing one or more of said plurality of seismic source signals patterns ($p_1$, $p_2$ ... $p_n$) to improve separability during an adaptive subtractive or inversion process;

e) applying said patterns through said vibratory source to a reservoir, f) acquiring reflected and refracted seismic signal data at one or more receivers;

g) processing said signal data to create a seismic survey; and h) creating an image of the subsurface.

8. The method of claim 7, wherein confirming step d) uses cross-correlating two patterns and changing one of them to maximize the separability, and repeating for each pair of patterns.

9. The method of claim 7, wherein said processing includes separating reflected and refracted seismic signal data from each of said patterns.

10. The method of claim 9, wherein said separating step uses inversion.

11. The method of claim 9, wherein said separating step uses an iterative adaptive subtraction method.

12. A method of surveying a reservoir using one or more seismic source signals of claim 4, comprising:

a) providing one or more electric vibratory sources near a reservoir;

b) each vibratory source providing a different acoustic signal pattern p ($p_1, p_2 \ldots p_n$), having a length t ($t_1, t_2 \ldots t_n$);
c) each pattern ($p_1, p_2 \ldots p_n$) comprising a plurality of frequencies and a plurality of amplitudes having a rhythm, wherein said plurality of frequencies and plurality of amplitudes do not vary sequentially for more than 6 notes over length t;
d) confirming by cross correlation that said plurality of patterns ($p_1, p_2 \ldots p_n$) do not substantially overlap such that they can be separated from each other, and if not, altering one or both of said patterns to maximize a separability of said patterns during an adaptive subtractive or inversion process;
e) applying said patterns to said reservoir;
f) acquiring reflected and refracted signal data at one or more receivers;
g) separating said signal data from each of said patterns to produce separated data;
h) processing said separated data to produce processed data; and,
i) displaying a graphical representation of said reservoir based on said processed data.

13. The method of claim 12, wherein said separating step uses inversion.

14. The method of claim 12, wherein said separating step uses an iterative adaptive subtraction method.

15. The method of claim 12, wherein said patterns are applied to said reservoir simultaneously.

16. The method of claim 12, wherein said patterns are applied to said reservoir sequentially.

17. A computer comprising a computer readable storage medium with a plurality of seismic source signals for seismic surveying, providing a plurality of seismic source signals, each of said seismic source signals having a length and a series of non-sequentially varying frequencies and a rhythm, wherein each of the seismic source signals is unique and do not overlap for more than 4 notes in frequency or rhythm such that the plurality of seismic source signals can be distinguished from each other, and cross correlating two or more of said seismic source signals, changing one or more of the seismic sources signals to provide seismic source signals with maximum separability during an adaptive subtractive or inversion process said seismic source signals having sufficient energy to meet an imaging objective.

18. The plurality of seismic source signals of claim 17, which do not overlap in timbre.

19. The plurality of seismic source signals of claim 17, which do not overlap in amplitude.

20. The plurality of seismic source signals of claim 17, which do not overlap in phase.

* * * * *